United States Patent
McGee et al.

(10) Patent No.: US 6,356,807 B1
(45) Date of Patent: Mar. 12, 2002

(54) METHOD OF DETERMINING CONTACT POSITIONS, CALIBRATION PARAMETERS, AND REFERENCE FRAMES FOR ROBOT ASSEMBLIES

(75) Inventors: H. Dean McGee, Rochester Hills; Eric C. Lee, Bloomfield Hills, both of MI (US)

(73) Assignee: FANUC Robotics North America, Inc., Rochester Hills, MI (US)

( * ) Notice: Subject to any disclaimer, the term of this patent is extended or adjusted under 35 U.S.C. 154(b) by 0 days.

(21) Appl. No.: 09/639,436

(22) Filed: Aug. 12, 2000

Related U.S. Application Data
(60) Provisional application No. 60/148,796, filed on Aug. 13, 1999.

(51) Int. Cl.[7] .............................................. G05B 19/04
(52) U.S. Cl. .................. 700/253; 700/245; 700/248; 700/251; 700/257; 700/259; 700/260; 700/261; 700/262; 318/568.11; 318/568.13; 318/568.16; 318/568.2; 318/568.22; 318/577; 29/407.04; 29/702; 29/720
(58) Field of Search .......................... 700/245, 251, 700/253–254, 166, 259–262, 61, 248, 193, 195, 163, 257, 213; 318/568.11, 568.16, 568.13, 568.22, 568.2, 574, 577, 640; 29/407.04, 407.01, 702, 720; 901/46, 47, 9, 7, 23

(56) References Cited

U.S. PATENT DOCUMENTS

| | | |
|---|---|---|
| 4,030,617 A | 6/1977 | Richter |
| 4,531,192 A | 7/1985 | Cook |
| 4,598,380 A | 7/1986 | Holmes et al. |
| 4,670,641 A | 6/1987 | Porsander et al. |
| 4,700,118 A | 10/1987 | Kishi et al. |
| 4,786,847 A * | 11/1988 | Daggett et al. .......... 318/568.2 |
| 4,792,715 A | 12/1988 | Barsky et al. |
| 4,796,200 A * | 1/1989 | Pryor .......................... 700/259 |
| 4,815,006 A | 3/1989 | Andersson et al. |
| 4,816,733 A | 3/1989 | Sakakibara et al. |
| 4,826,392 A | 5/1989 | Hayati |

(List continued on next page.)

FOREIGN PATENT DOCUMENTS
JP  11179545 A  *  7/1999

OTHER PUBLICATIONS

Yu et al., Self calibration of focal length and rotation parameters using cross ratio, 1998, IEEE, pp. 1828–1833.*

Ghos et al., Robotic motion panning and manipulation in an uncalibrated environment, 1998, IEEE, pp. 50–57.*

Giugovaz et al., Closed–loop kinematic calibration of the sarcos dextrous arm, 1998, IEEE, pp. 329–334.*

Lenz et al., Calibrating a cartesian robot with eye–on–hand configuration independent of eye–to–hand relationship, 1988, IEEE, pp. 67–75.*

Astley et al., Design constraints for haptic surgery simulation, 2000, IEEE, pp. 2446–2451.*

Rosen et al., Markov modeling of minimally invasive surgery based on tool/tissue interaction and force/torque signatures for evaluating surgical skill, 2001, IEEE, pp. 579–591.*

*Primary Examiner*—William A. Cuchlinski, Jr.
*Assistant Examiner*—McDiennel Marc
(74) *Attorney, Agent, or Firm*—Howard & Howard

(57) ABSTRACT

A method of determining contact positions of a robot relative to a workpiece in a workspace of the robot. The method utilizes the contact positions to determine a location of the workpiece in the robot workspace. The method also monitors an integral operating parameter within the robot, such as motor torque, to determine the contact positions of the robot relative to the workpiece and to locate the workpiece.

47 Claims, 5 Drawing Sheets

U.S. PATENT DOCUMENTS

| | | | |
|---|---|---|---|
| 4,835,710 A | | 5/1989 | Schnelle et al. |
| 4,835,730 A | * | 5/1989 | Shimano et al. ............ 700/257 |
| 4,979,127 A | | 12/1990 | Mizuno et al. |
| 5,053,976 A | | 10/1991 | Nose et al. |
| 5,191,271 A | | 3/1993 | Hobmaier |
| 5,194,792 A | | 3/1993 | Hara |
| 5,268,837 A | * | 12/1993 | Saylor ........................ 700/612 |
| 5,297,238 A | * | 3/1994 | Wang et al. ................. 700/259 |
| 5,329,469 A | | 7/1994 | Watanabe |
| 5,331,232 A | * | 7/1994 | Moy et al. ............. 318/568.11 |
| 5,428,280 A | * | 6/1995 | Schmidt et al. ........ 318/568.11 |
| 5,451,117 A | | 9/1995 | Lajoie |
| 5,457,367 A | | 10/1995 | Thorne |
| 5,489,759 A | | 2/1996 | Litt et al. |
| 5,528,116 A | | 6/1996 | Snell |
| 5,548,194 A | | 8/1996 | Hamura et al. |
| 5,562,843 A | | 10/1996 | Yasumoto |
| 5,687,293 A | | 11/1997 | Snell |
| 5,727,132 A | | 3/1998 | Arimatsu et al. |
| 5,748,854 A | | 5/1998 | Watanabe et al. |
| 5,778,549 A | | 7/1998 | Campanile |
| 5,796,229 A | | 8/1998 | Akeel |
| 5,828,197 A | | 10/1998 | Martin et al. |
| 5,898,285 A | | 4/1999 | Nagasawa et al. |
| 5,910,719 A | | 6/1999 | Thorne |
| 5,949,685 A | * | 9/1999 | Greenwood et al. ........ 700/193 |
| 6,044,308 A | * | 3/2000 | Huissoon .................... 700/166 |
| 6,070,109 A | | 5/2000 | McGee et al. |
| 6,163,946 A | * | 12/2000 | Proy ...................... 29/407.04 |
| 6,167,607 B1 | * | 1/2001 | Proy ...................... 29/407.04 |

* cited by examiner

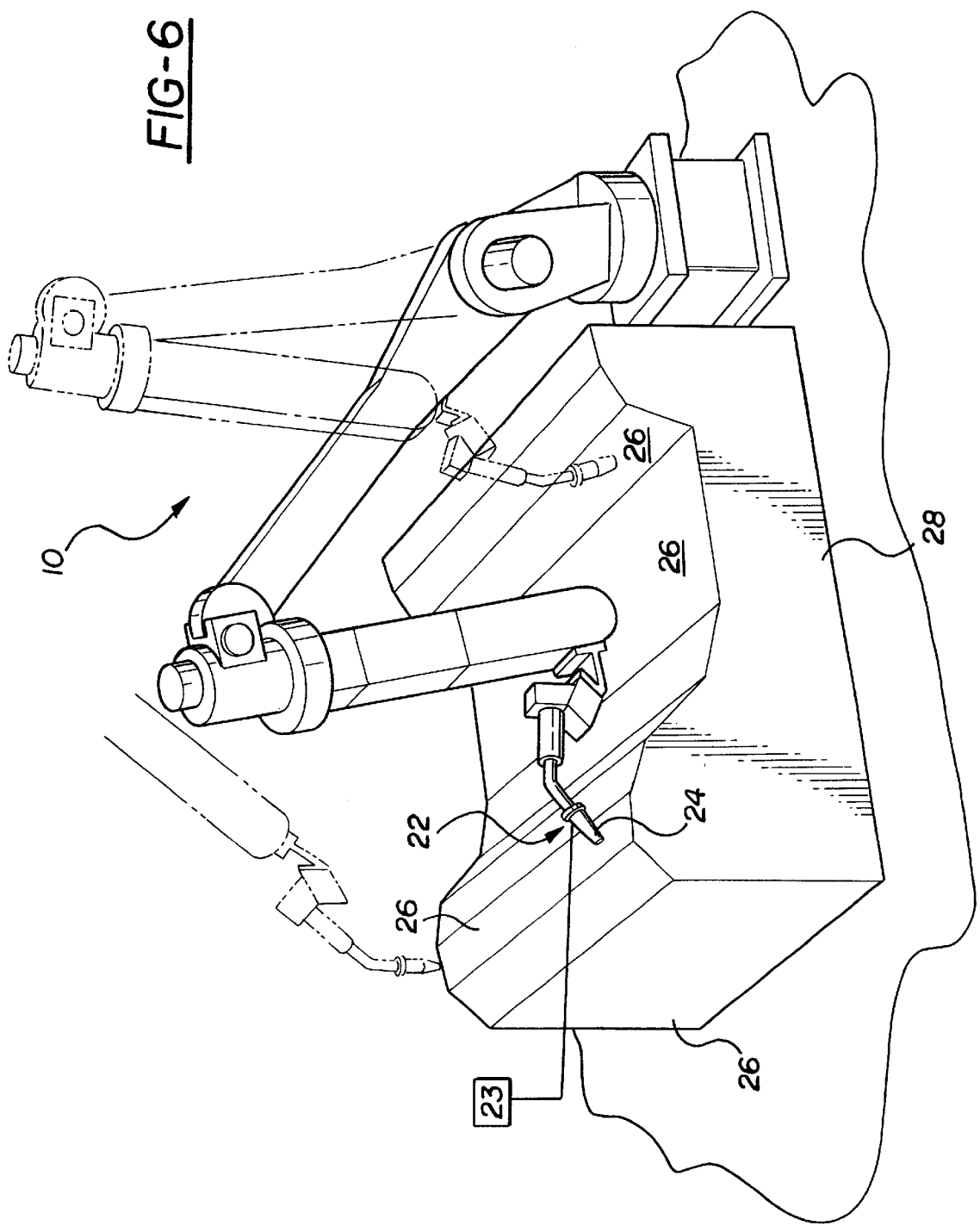

METHOD OF DETERMINING CONTACT POSITIONS, CALIBRATION PARAMETERS, AND REFERENCE FRAMES FOR ROBOT ASSEMBLIES

RELATED APPLICATIONS

This patent application claims priority to and all advantages of U.S. Provisional Patent Application No. 60/148,796 which was filed on Aug. 13, 1999.

BACKGROUND OF THE INVENTION

1) Technical Field

The subject invention generally relates to a method of utilizing a sensing technology that monitors an integral operating parameter, such as torque observer sensing which monitors motor torque, within a robot assembly in various robot control and calibration applications.

More specifically, these various robot control and calibration applications include, but are not limited to, determining the position of a workpiece or other external object in an operating space of a robot assembly, determining contact positions of the robot assembly relative to the external objects, determining and adjusting a tool frame of the robot assembly, determining calibration parameters for the robot assembly, determining a working, or reference, frame of the robot assembly which assists in determining the position of the workpiece within the operating space, and the calibration of the robot assembly. The subject invention may also incorporate a sensing device in place of the sensing technology for determining the calibration parameters and the reference frame.

2) Description of the Prior Art

Various control and calibration methods for robots as well as the apparatuses used for such methods are known in the art. For instance, the control method and apparatus for determining contact and maintaining contact between a robot and an object is known in the art. As appreciated, such conventional methods and apparatuses are typically critical to the safe and optimal utilization of a robot in applications such as are welding, spot welding, waterjet cutting, and dispensing.

An example of such a conventional method and apparatus is disclosed in U.S. Pat. No. 5,562,843 to Yasumoto. Specifically, the '843 patent to Yasumoto discloses an external contact sensor for a robot that senses contact with a conductive object. Upon sensing the conductive object, a robot controller, in communication with the contact sensor, immediately ceases operation and movement of the robot in order to prevent the robot from colliding with an unintended object and to ensure a safe operating environment.

A further example of such a conventional method and apparatus is disclosed in U.S. Pat. No. 4,670,641 to Porsander et al. Specifically, the '641 patent to Porsander et al. discloses a welding robot having a robot arm. A welding gun is disposed on the robot arm, and a sensing wheel arrangement is provided with the welding gun to assist the welding gun in following a contour of a workpiece. As a result, optimal welding of a weld joint is ensured regardless of the contour of the workpiece or even the continuity of the weld joint.

Notice that, in order to determine or maintain contact between the robot and an object, the sensing technologies of the prior art require additional devices that are peripheral to the robot apparatus. More specifically, the '843 patent to Yasumoto requires the contact sensor and the '641 patent to Porsander requires the sensing wheel arrangement to sense contact between the robot and the object. With such additional equipment required to determine or maintain contact, there is a greater likelihood that the methods and apparatuses of the prior art will not accurately determine or maintain contact between the robot and the workpiece due to potential failures of and interferences with this additional equipment.

Such conventional methods and apparatuses are further deficient in that they do not 'actively' utilize a sensing technology that monitors an integral operating parameter, such as torque observer sensing, in the various robot control and calibration technologies. Most importantly, although these conventional methods and apparatuses may apply a sensing technology to determine and maintain contact between the robot and the object, they are deficient in that they do not 'actively' utilize contact between the robot and an object or a workpiece with a sensing technology to determine a location of the object or workpiece in the operating space of the robot. Further, the conventional methods and apparatuses do not utilize a sensing technology to monitor an integral operating parameter to determine contact positions of the robot relative to the external objects, to determine and adjust a tool frame of the robot, to determine calibration parameters for the robot, to determine a working, or reference, frame of the robot, or to calibrate the robot.

Instead, the conventional methods and apparatuses merely determine or maintain contact between the robot and the workpiece or object. Specifically, the conventional methods and apparatuses do not 'actively' determine the location and position of the workpiece or object in the operating space of the robot, or they require costly peripheral equipment. For example, the method and apparatus disclosed in the '843 patent to Yasumoto does not even monitor an integral operating parameter of the robot, such as motor torque. Instead, the apparatus employs an external contact sensor and merely 'stops' when contact is sensed at the contact sensor. Further, the method and apparatus in the '843 patent does not determine the location and position of the object or workpiece that the external sensor contacts.

The conventional methods and apparatuses also do not disclose a method for determining calibration parameters, such as a tool frame or tool center point (TCP) of the robot, using a calibration plaque having a bounded void as in the subject invention. In particular, although U.S. Pat. No. 5,910,719 to Thorne provides a calibration plaque in the operating space of the robot, the method disclosed in the '719 patent to Thorne only utilizes flat surfaces of the calibration plaque. As such, the '719 patent to Thorne is deficient because it can only determine a location of the TCP, it can not determine the location and orientation of the TCP as with the calibration plaque having bounded voids of the subject invention.

Due to the limited application of conventional methods and apparatuses, as evidenced by the inefficiencies identified above, it is desirable to implement novel methods that do not require additional equipment to sense contact between a robot and an object or workpiece by monitoring integral operating parameters of the robot. It is additionally desirable that such a method 'actively' utilize contact between the robot and the object or workpiece to determine a location of that object in the operating space of the robot. It is further desirable to introduce methods that determine calibration parameters and reference frames for robot assemblies utilizing contact between the robot and the object or workpiece and a sensing device.

SUMMARY OF THE INVENTION AND ADVANTAGES

A method of determining a contact position of a robot assembly relative to an object external to the robot assembly is disclosed. The robot assembly includes at least one arm having a contact surface. The robot assembly further includes a robot controller.

The method of the subject invention includes the step of moving the robot assembly from an initial position toward the contact position. More specifically, at the initial position, the contact surface is spaced from the external object, and at the contact position, the contact surface of the robot arm contacts a point on the external object. The method further includes the step of determining operating values of the robot assembly as the robot assembly moves between the initial position and the contact position. Additionally, at least one operating parameter threshold is established. With the operating parameter threshold established, the operating values can be compared to the established threshold. To determine the contact position of the robot assembly according to the subject invention, the movement of the robot assembly is continued so long as the operating values are less than or equal to the operating parameter threshold. The contact position of the robot assembly is recorded when the operating values exceed the operating parameter threshold.

The subject method invention is characterized by monitoring an integral operating parameter to determine the operating values of the robot assembly. That is, the step of determining operating values is further defined as monitoring the integral operating parameter within the robot assembly during the movement of the robot assembly between the initial position and the contact position. Monitoring the integral operating parameter determines when the robot assembly contacts the external object.

Similar methods according to the subject invention may be employed to determine calibration parameters of the robot assembly and to determine a reference frame in an operating space of the robot assembly. More specifically, to determine a calibration parameter, a calibration plaque is mounted within the operating space of the robot assembly. The calibration plaque includes an outer facing and at least one calibration element. The calibration element on the calibration plaque defines a bounded void having an inner surface. In this method of the subject invention, the robot assembly incorporates a sensing device that detects contact between the contact surface of the robot arm and the inner surface of the bounded void.

Similar to the above-described method, this method includes the step of moving the robot assembly from the initial position toward the contact position. However, this embodiment of the subject invention is characterized by moving the robot assembly from the initial position where the contact surface is spaced from the inner surface of the bounded void toward the contact position where the contact surface of the robot arm is at least partially extended into the calibration element and contacts a segment on the inner surface of the bounded void.

Once movement of the robot assembly is initiated, in this method, the sensing device detects when the contact surface of the robot arm contacts the segment on the inner surface of the bounded void. As above, movement of the robot assembly is continued until the contact surface contacts the segment. Then, the contact position of the robot assembly relative to the inner surface of the bounded void is recorded when the sensing device detects contact between the contact surface and the segment.

The method to determine the reference frame in the operating space of the robot assembly includes the steps of determining a plurality of contact points relative to the reference frame, and determining a first vector approximately normal to either the contact surface of the robot arm or a contact surface of the external object, referred to as an object contact surface. The first vector is approximately normal either of these surfaces at one of the plurality of contact points. This method further includes the step of determining a geometrical relationship between the robot assembly and at least one of the contact surface and the object contact surface.

Next, as in the previously described methods, the robot assembly is moved from the initial position toward the contact position. However, this embodiment of the subject invention is characterized by moving the robot assembly from the initial position where a second vector, between the contact surface and the contact point, is approximately normal to at least one of the contact surface and the object contact surface along the first vector toward the contact position where the contact surface of the robot arm contacts the object contact surface.

The movement of the robot assembly continues until the sensing device detects contact between the contact surface of the robot arm and the object contact surface, and the contact position of the robot assembly is recorded when the contact is detected by the sensing device.

Accordingly, the subject invention provides novel methods, such as the method of determining the contact position of the robot assembly relative external objects, that eliminate external sensors and 'actively' utilize the contact positions of the robot assembly to determine the location of the external object in the operating space of the robot assembly by monitoring integral operating parameters, such as motor torque, within the robot assembly. The subject invention also provides a novel method for determining calibration parameters of the robot assembly by incorporating a sensing device to detect contact and moving the contact surface of the robot assembly within a calibration plaque having bounded voids. The subject invention further provides a novel method of determining reference frames for robot assemblies utilizing the sensing device to detect contact between the contact surface on the robot arm and the contact surface of the external object.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a perspective view of a multi-dimensional workpiece illustrating the plurality of contact points across surface of the workpiece required for determining a reference fraic within an operating space of the robot.

DETAILED DESCRIPTION OF THE PREFERRED EMBODIMENT

Figure 1A:
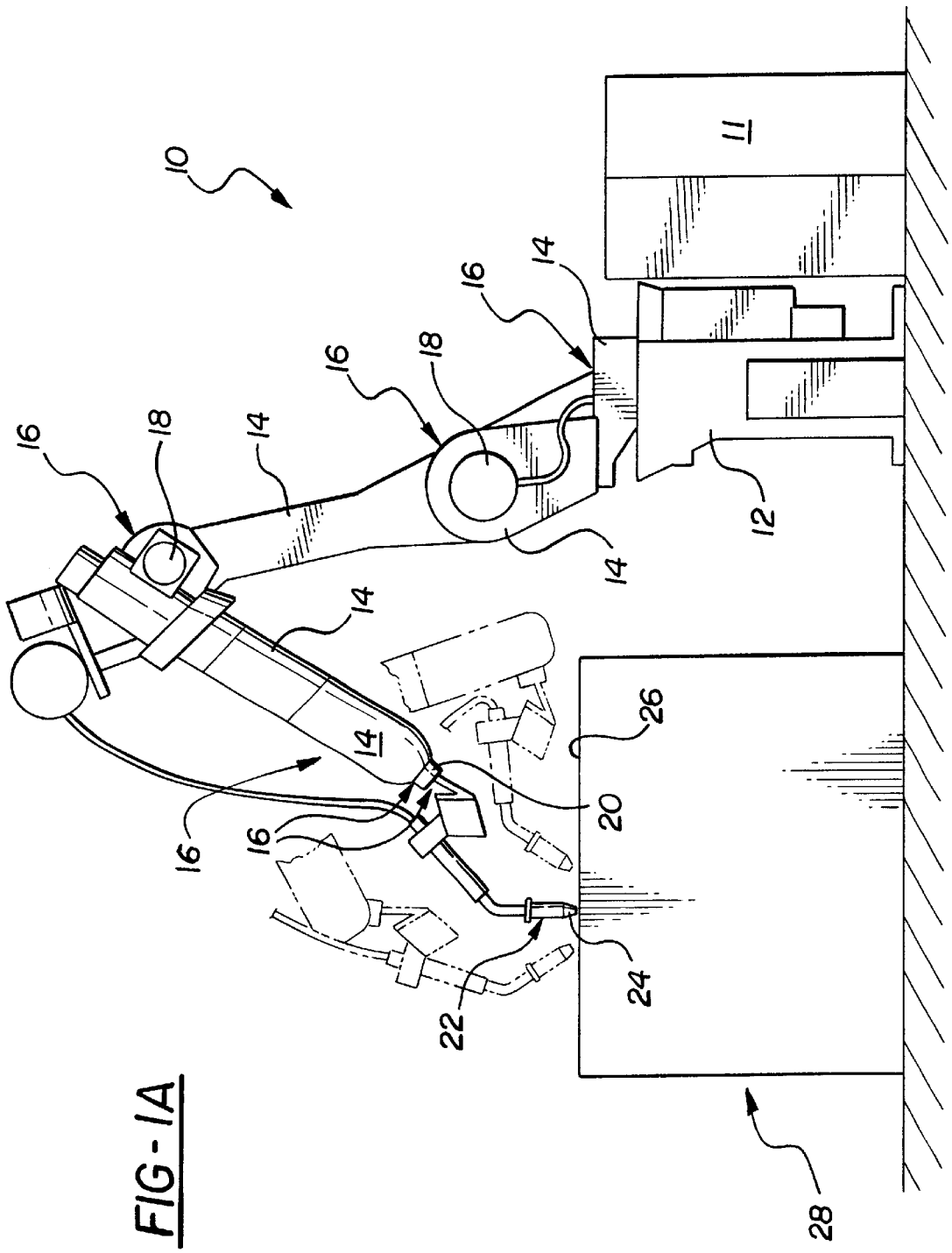
FIG. 1A is a side view of a robot assembly illustrating a contact surface of the robot assembly manipulating about an object, or workpiece, to contact the object at a plurality of contact positions.

Referring to the Figures, wherein like numerals indicate like or corresponding parts throughout the several views, a robot assembly is generally shown at 10. Referring to FIG. 1A, the robot assembly 10 includes a base 12 and a plurality of extension members, or robot arms, 14 extending from the base 12. The extension members 14 have a contact surface 24 where contact between the robot assembly 10 and objects 28 external to the robot assembly 10 is detected. In view of the following description it is important to recognize that the external objects 28 can be either a workpiece 28 (as shown in FIG. 1A) or a tool fixture depending on the particular application which will be described further below. The contact surface 24 can be disposed on the robot arms 14 or can be disposed on a tool 22 as will be described below. Also, in the preferred embodiment of the subject invention, a geometrical relationship between the contact surface 24 on the robot arm 14 and the robot assembly 10 is determined such that the robot assembly 10 'recognizes' where the contact surface 24 is located.

A plurality of axes 16 are disposed at a union 18 of each of the extension members 14. The assembly 10 further includes motors (not numbered in the Figures) integrally disposed near each of the axes 16 for providing motion to each of the extension members 14. The assembly 10 also includes a face plate 20 disposed at a distal end (not numbered) of one of the extension members 14. The face plate 20 of the assembly 10 supports the tool 22 having a tool contact surface 24 for contacting a surface 26 of the workpiece 28. In the preferred embodiment of the subject invention, the tool contact surface 24 functions as the contact surface 24 of the robot assembly 10. As such, for descriptive purposes, the contact surface 24 will be numbered the same as the tool contact surface 24. The assembly 10 further includes a robot controller 11 for controlling the motion produced by the motors.

A method of determining a contact position of the robot assembly 10 relative to the external object 28 is disclosed. The contact position will be further described below. Ultimately, this method serves to determine the location of the external object 28 in an operating space of the robot assembly 10 utilizing only the assembly 10 shown in FIG. 1A and described above. Notice that the assembly 10 employed in the subject method invention does not require additional devices to determine the location of the external object 28 in the operating space of the robot assembly 10.

This method first includes the step of positioning the contact surface 24 of the robot arm 14, in the preferred embodiment the tool contact surface 24, to an initial position relative to the object 28 external to the robot assembly 10. It is to be understood that the initial position of the contact surface 24 is not critical provided the contact surface 24 is spaced from the external object 28. From the initial position, the robot assembly 10 is moved toward the contact position. At the contact position, the contact surface 24 of the robot arm 14 contacts a point on the external object 28. To move the robot assembly 10, an operator (not shown in the Figures) issues a robot motion command that interacts with the controller 11 to move the assembly 10. The operator moves the robot assembly 10 toward, not directly to, the contact position. Instead, the robot assembly 10 is moved where it contacts in the vicinity of what is to be the ultimate contact position. To accomplish this, the operator issues the robot motion command to move the robot assembly 10 along a predetermined trajectory toward the contact position.

The method further includes the step of selecting at least one axis 16 on a portion of the robot assembly 10 where an integral operating parameter of the robot assembly 10 is to be monitored. The integral operating parameter will be further described below. More specifically, the operator selects one of the plurality of axes 16 to establish the selected axis as a sensor axis (not numbered) where the integral operating parameter is to be monitored.

In the preferred embodiment of the subject invention, in order to determine contact between the tool contact surface 24 and the external object 28, the robot controller 11 monitors the integral operating parameter at the sensor axis. In further embodiments of the subject method invention, the operator may select more than one of the plurality of axes 16 to establish the selected axes as a plurality of sensor axes. As appreciated by those skilled in the art, in such an embodiment the robot controller 11 monitors integral operating parameters at all of the sensor axes. In order to reduce the amount of vibration, and therefore potential error, at the sensor axis or axes, the subject invention further includes the step of maintaining a position of the selected axis relative to the portion of the robot assembly 10 throughout the moving of the robot assembly 10. Isolating the effect of the motion command from the sensor axis or axes significantly improves the signal to noise ratio thereby reducing the force applied to the contact point that is required for detecting contact.

The method of determining the contact position of the robot assembly 10 further includes the step of determining operating values of the robot assembly 10 as the assembly 10 moves between the initial position and the contact position. More specifically, the operating values are determined at the sensor axis. To determine the operating values of the robot assembly 10, the integral operating parameter within the robot assembly 10 is monitored as suggested above. That is, the step of determining operating values is further defined as monitoring the integral operating parameter within the robot assembly 10 during the movement of the robot assembly 10 between the initial position and the contact position. Monitoring the integral operating parameter determines when the robot assembly 10 contacts the external object 28. Alternatively, multiple integral operating parameters can be monitored.

In the preferred embodiment, the subject invention, via a sensing technology referred to as torque observer sensing, monitors motor torque as the integral operating parameter. More specifically, the extent of torque on the motor associated with the selected sensor axis is monitored. As a measure of the extent of torque on the motor associated with the selected sensor axis, the amount of electrical current conveyed to the respective motor is monitored. Further, if more than one axis 16 has been selected to establish a plurality of sensor axes, then the extent of torque on the motors respectively associated with each of the selected sensor axes can be monitored.

Alternatively, the integral operating parameter to be monitored in the subject invention can be selected from the group consisting of velocity of the robot assembly 10, acceleration of the robot assembly 10, position of the robot assembly 10, jerk of the robot assembly 10, motor torque of the robot assembly 10, and motor current of the robot assembly 10, and combinations thereof. The integral operating parameter of position of the robot assembly 10 is understood by those skilled in the art as 'position-error sensing' where the robot controller 11 or an auxiliary controller, not shown in the Figures, measures an actual position of the robot assembly 10 versus a previously anticipated position, determines the extent of error between the actual position and the anticipated position, and adjusts the output of the motor to account for such error.

It is to be understood that the group of potential integral operating parameters to be monitored includes, but is not limited to, the above described group. Each selected integral operating parameter will be monitored at the selected sensor axis. As such, the subject method invention does not require additional devices to determine the contact position of the robot assembly 10 and determine the location of the external object 28 in the operating space.

As understood by those skilled in the art, the auxiliary controller which is not integral to the robot controller 11, may be implemented to monitor the sensor axis in the manner described above. Also as appreciated by those skilled in the art, in order to determine contact between the tool contact surface 24 and the workpiece 28, the robot 11 or auxiliary controller may also monitor and sense other integral operating parameters disclosed above.

The subject invention also includes the step of establishing at least one operating parameter threshold. Preferably, the operating parameter threshold is established for the selected sensor axis where the integral operating parameter is monitored. The operating parameter threshold is also established for the selected sensor axis such that the threshold correlates to the selected integral operating parameter that is being monitored. That is, if the velocity of the robot assembly 10 is selected as the integral operating parameter to be monitored, then the threshold will also relate to velocity such that it can be correlated to the selected integral operating parameter of velocity. However, the threshold may also be a function of many operating parameters as well as other variables including, but not limited to, speed, orientation with respect to gravity, and external forces.

The operating parameter threshold indicates movement of the robot assembly 10 independent of contact with the external object 28. As such, with the operating parameter threshold established, the operating values can be compared to the established threshold, and the contact position of the robot assembly 10 can be determined when the operating values exceed the operating parameter threshold as described below.

To determine the contact position of the robot assembly 10, the subject invention continues movement of the robot assembly 10 so long as the operating values are less than or equal to the operating parameter threshold. The contact position of the robot assembly 10 is recorded when the operating values exceed the operating parameter threshold. In the preferred embodiment of the subject invention, the contact position of the robot assembly 10 is recorded when the operating values exceed the operating parameter threshold by a predetermined tolerance. The predetermined tolerance is understood by those skilled in the art from experience and can be modified depending on the desired sensitivity of the assembly 10. The recorded contact position of the robot assembly 10 can be stored for subsequent reference. The recorded contact position is processed to obtain a positional value indicative of the location of the external object 28 in the operating space of the robot assembly 10, and these recorded contact positions can be stored for subsequent reference.

After the robot assembly 10 contacts the external object 28, the robot assembly 10 can be repositioned into the initial position after the robot assembly 10 contacts the external object 28. As explained previously, the initial position is not critical. As such, the robot assembly 10 can then be moved toward a second contact position where the contact surface of the robot arm 14 contacts a second point on the external object 28. In a similar manner, the robot assembly 10 can then be moved toward a plurality of contact positions where the contact surface of the robot arm 14 contacts a plurality of corresponding points on the external object 28. This is represented in phantom in FIG. 1A. The plurality of contact points are recorded when the operating values of the robot assembly 10 exceed the operating parameter threshold, and can be stored as described above with respect to the single contact point. The recorded contact points are processed to obtain multiple positional values indicative of the location of the external object 28 in multiple degrees of freedom. These positional values are stored such that the assembly 10 can recall the position of the workpiece 28 or similarly contoured other workpieces (not shown) at a subsequent time. With the contact points representing positional values of the external object 28 stored, the subject invention further includes the step of determining a difference between the stored contact positions and a second plurality of stored contact positions representing current contact positions to correct any error in calibration of the robot assembly 10. Additionally, the plurality of contact positions can be utilized to determine a working frame of the robot assembly 10.

As described, it is advantageous to repeat the method for determining the contact position of the robot assembly 10 such that the position of the workpiece 28 can be located in multiple degrees of freedom. In particular, it is advantageous to repeat the subject method to locate the workpiece 28 in multiple degrees of freedom when the surface 26 of the workpiece 28 varies in orientation and in contour. As appreciated, the number of iterations that the subject method is repeated is at least equal to the multiple degrees of freedom. For instance, if the operator practices 5 iterations of the subject method, then the workpiece 28 can be located in up to 5 degrees of freedom. Also, as in the case of a single iteration of the subject method, the positional values, in this case representing the position of the workpiece 28 in the operating space of the robot assembly 10 in multiple degrees of freedom, are stored so the assembly 10 can recall the position of the workpiece 28 in multiple degrees of freedom at a subsequent time.

The subject invention further includes the step of determining a correction factor to determined variances in the location from one external object 28 to another. More specifically, this correction factor is defined as the difference between the obtained location of the external object 28 and a previously obtained location of the external object 28. In a preferred application, the subject method enables the robot assembly 10 to find the center of the external object 28. Recall that the external object 28 may be the workpiece 28 or the tool fixture. When the external object 28 is the tool fixture, the tool fixture is preferably a machine tool chuck having fingers. The plurality of contact positions are actually on the fingers of the machine tool chuck such that the processing of the contact points determines the center of the machine tool chuck.

Proceeding by way of a descriptive example only with respect to the integral operating parameter to be monitored as motor torque, a motor torque limit is selectively established by the operator as the operating parameter threshold. Further, as described above, the motor torque limit is associated with the selected sensor axis. The operator selects the motor torque limit such that the motor torque limit is not exceeded unless the robot assembly 10 establishes contact with the external object 28. As appreciated, the motor torque limit selected by the operator can include both an upper motor torque limit and a lower motor torque limit. Further, the motor torque limit can be a mathematical function of operating variables such as speed, acceleration, jerk, moment of inertia, and similar parameters that affect the dynamics of a robot assembly 10.

The operator executes the motion command causing the robot assembly 10 to move and the tool contact surface 24 of the robot assembly 10 to contact the external object 28. As discussed above, it is preferred that the motion of the robot assembly 10 does not affect the selected sensor axis or axes. The robot controller 11 or auxiliary controller monitors the sensor axis for the extent of torque on the motor associated with the selected sensor axis. Due to the established motor torque limit, motion of the robot assembly 10 ceases when the motor torque on the motor associated with the sensor axis exceeds the motor torque limit thereby indicating contact with the workpiece 28. As appreciated, the point of actual contact may be more precisely determined by torque and other values stored prior to the instant that the torque crosses the motor torque limit. With respect to the alternative embodiment of the subject method application where the operator selects more than one sensor axis, motion of the robot assembly 10 ceases when the motor torque on any one of the motors associated with any one of the plurality of sensor axes exceeds the motor torque limit or limits set by the operator.

Next, the plurality of positional values are obtained by either the robot controller 11 or auxiliary controller. The positional values are obtained when motion of the robot assembly 10 causes the assembly 10 to contact the external object 28 and the motor torque associated with the motor for the sensor axis exceeding the motor torque limit. The positional values represent the position of the workpiece 28 in the operating space of the assembly 10. As discussed above, these positional values can be stored such that the assembly 10 can recall the position of the workpiece 28 or similarly contoured other workpieces (not shown) at a subsequent time.

The description set forth above, including the example where the integral operating parameter to be monitored is motor torque, has been framed in terms of the external object 28 being a workpiece 28 fixed in the operating space of the robot assembly 10 where the assembly 10 is moved to contact the fixed external object 28. However, alternative embodiments are possible. These alternative embodiment require that the external object be understood to be the tool fixture, such as a welding tool or as the machine tool chuck, fixed in the operating space of the robot assembly 10.

Now, if instead of the workpiece 28 being fixed in the operating space, the workpiece 28, such as a muffler, is held within the robot arm 14 by a device such as a robot gripper, and the workpiece 28 is moved with the robot arm 14 upon manipulation of the assembly 10, then the contact surface, previously described as the tool contact surface 24, can now be defined by the surface 26 of the workpiece 28 being held in the robot arm 14. As such, in this alternative embodiment, when the robot assembly 10 is moved from the initial toward the second contact position, the external object itself, which now is the tool fixture such as the welding tool, actually contacts a second point on the contact surface 26 of the muffler, which is defined as the surface on the workpiece 28 held in the robot arm or arms 14.

This same alternative embodiment can further include the step of moving the robot assembly 10 from the initial position toward a plurality of contact positions where the external object 28 contacts a plurality of corresponding points on the contact surface of the robot arm 14. In terms of the muffler and weld tool example set forth above, the robot assembly 10 is moved toward a plurality of contact positions such that the welding tool actually contacts the plurality of corresponding points on the contact surface of the muffler. The contact positions can be recorded as described above when the operating values of the robot assembly 10 exceed the operating parameter threshold.

The method for determining the position of the workpiece 28 in the operating space of the robot assembly 10 utilizes a sensing technology inherent in the assembly 10 introduced above to enable the location of the workpiece, or external object, 28 to be determined. That is, the assembly 10 introduced above does not require additional devices to determine the position of the workpiece 28. As previously discussed, in the preferred embodiment, the sensing technology involves monitoring motor torque as the integral operating parameter to determine the position of the workpiece 28. However, it is to be understood that monitoring integral operating parameters such as motor torque, or other measurable integral parameters, may also be utilized in other robot applications such as methods for determining calibration parameters. More specifically, monitoring motor torque as the integral operating parameter may be utilized in methods for determining calibration parameters of the robot assembly 10 such as a tool frame or a tool center point (TCP) of the robot assembly 10. That is, the contact positions can be utilized to determine the calibration parameter. As appreciated, determining the tool frame is critical to the efficient operation of the robot assembly 10 in a production environment because the robot assembly 10 may erratically collide with an unintended object and 'throw-off' an operational path of the robot assembly 10. In such a situation, rapid recovery of the tool frame of the robot assembly 10 is important and will be further described below.

Figure 1B:
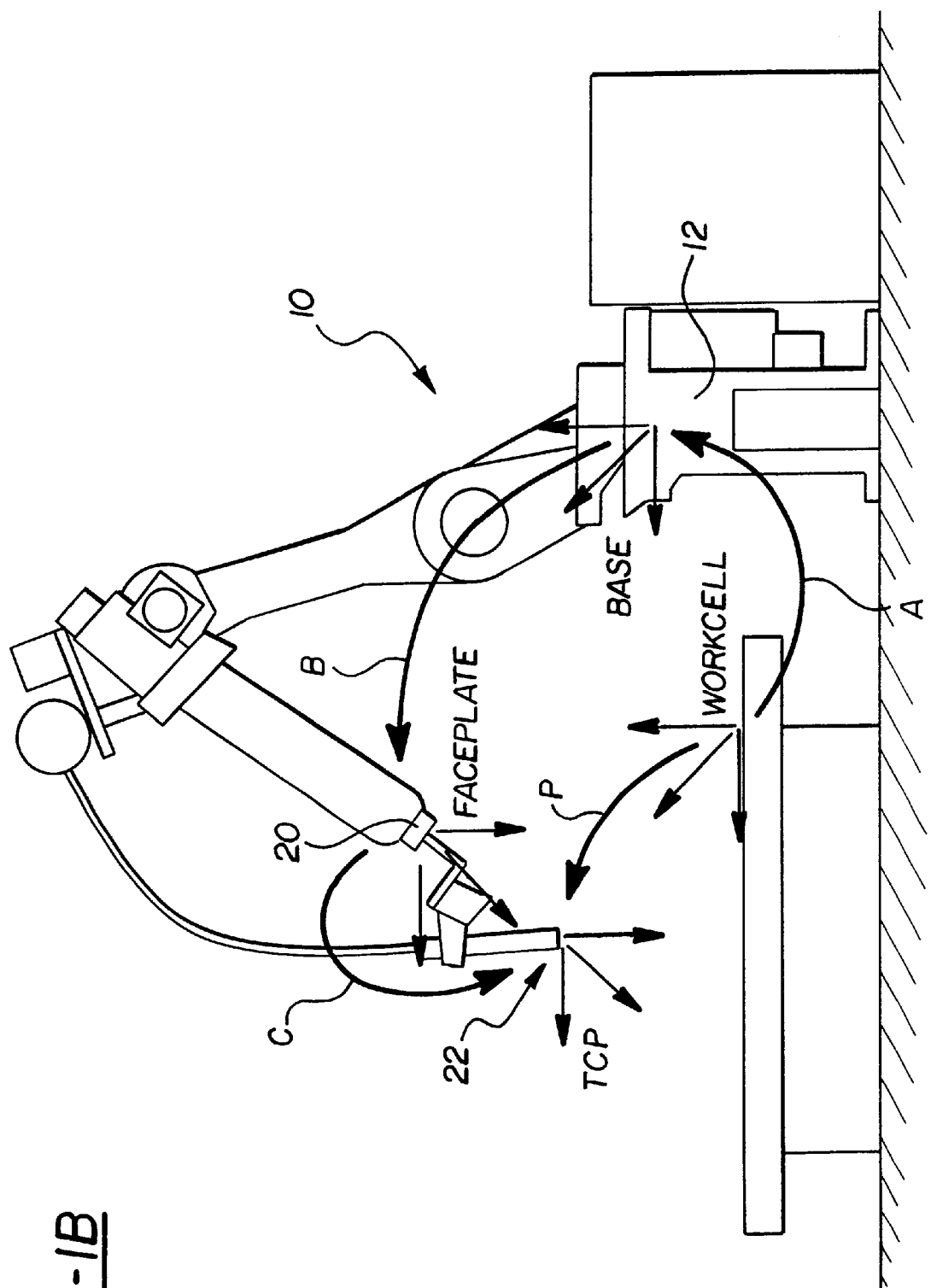
FIG. 1B is a side view of the robot assembly schematically illustrating frame relationships of a base, a face plate, a tool, a tool center point, and workcell frames of the robot assembly.

Referring to FIG. 1B, the tool frame of the robot assembly 10 is an abstract three-dimensional homogeneous transformation that represents a location and an orientation of the tool 22 with respect to the face plate 20 of the robot assembly 10. More specifically, (A) is the homogeneous transform from the workcell frame to the robot base 12, (B) is the homogeneous transform from the robot base 12 to the robot face plate 20, (C) is the homogeneous transform from the robot face plate 20 to the TCP, and P is the homogeneous transform from the workcell frame to the TCP such that P=A B C. The TCP is the focal point of rotation of the tool 22 during manipulation of the robot assembly 10. Thus, P is the position of the tool frame with respect to the workcell frame.

The equation of P=A B C describes the basis for how recorded positions are processed and calibration parameters are determined. Typically, the point of interest is the location component of P which can be represented as the variable p. When contact is made, the expected point of contact is represented by p and the actual point of contact is represented by p'. An error function is defined as e=p'−p. Typically, a solution which minimizes the squared error function is used. The methods described in this invention can take advantage of the known surface geometries, such as approaching the contact surfaces, such that the error is along an expected surface normal vector. Alternatively, the contact surfaces can be defined as easily modeled geometries such as cylindrical voids perpendicular to a planar surface. As understood by those skilled in the art, desired calibration parameters of P can be determined given sufficient contact points in sufficient corresponding positions of the robot arm 14. One skilled in the art would also recognize a variety of methods to solve for the calibration parameters given the invention described herein, and would recognize that iterations of the processes described herein would allow approximations, such as approximations to surface normals, to be used. On a real system, these iterations will converge to the desired correct calibration parameters.

As appreciated, the geometrical relationship between the contact surface of the robot arm 14 and the contact surface 26 of the external object 28 can be determined in a number of manners. For instance, this relationship is known by initial placement of the object 28 in the operating space of the robot assembly 10. Additionally, the relationship can be determined by searching along various search paths, and detecting contact between the contact surfaces for each search. It is understood by those skilled in the art that the detected contact positions can be processed to determine surface normal vectors, surface curvature, and other information.

Referring now to FIGS. 2–5, in addition to the assembly 10 disclosed above, the method for determining calibration parameters such as the tool frame of the robot assembly 10 or the TCP, preferably incorporates a sensing device 23 that detects contact between the contact surface 24 of the robot arm 14 and an inner surface 42 of a bounded void 36 which will be described in detail below. As appreciated, the sensing device 23 is only represented schematically in FIGS. 2 and 3. With reference to FIGS. 2–5, the method further incorporates a calibration plaque 32. The calibration plaque 32 includes an outer facing 33, and at least one calibration element 34 including the bounded void 36 for receiving the tool 22 of the robot assembly 10. The bounded void 36 includes the inner surface 42. As depicted in the Figures, the calibration plaque 32 includes a plurality of calibration elements 34. However, as appreciated, only a single calibration element 34 is required. The bounded void 36 of the calibration clement 34 may comprise any shape so long as the shape is of a known geometry. The bounded voids 36 shown in the Figures include a circular or a rectangular shape. Similar to the known geometry of the bounded voids 36, in determining the tool frame of the robot assembly 10, the tool 22 must also be of a known geometry relative to the face plate 20 or some other reference point on the robot assembly 10.

Figure 2:
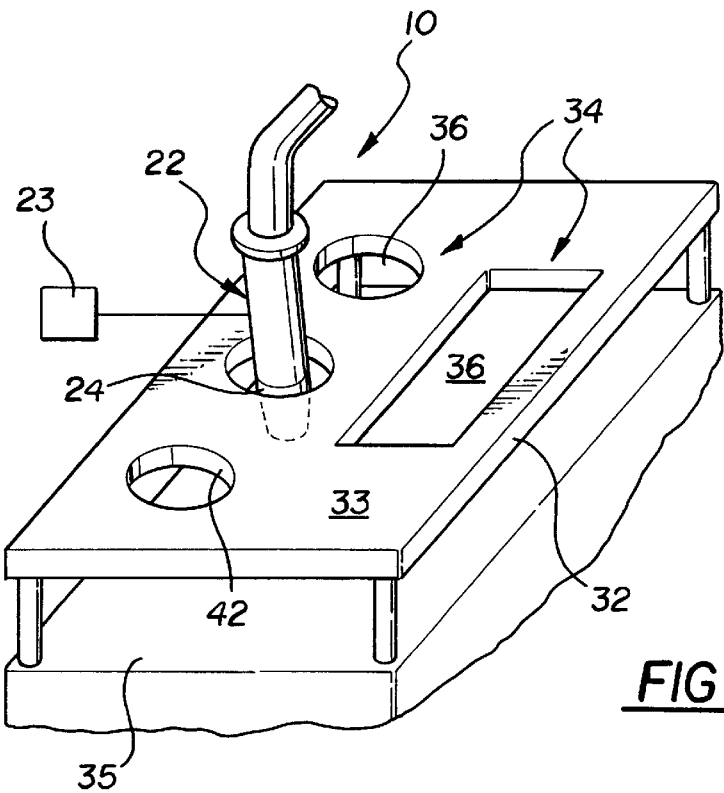
FIG. 2 is a perspective view of a calibration plaque in an operating space of the robot assembly with the contact surface extending at least partially into a bounded void of the calibration plaque for determining a location of a tool center point (TCP)
Figure 3:
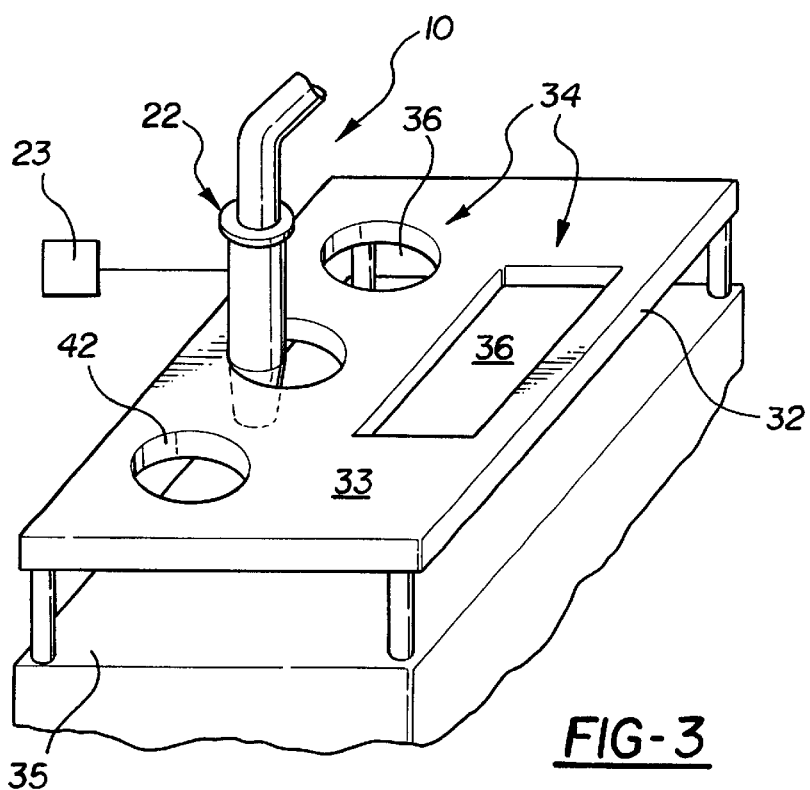
FIG. 3 is a perspective view of the calibration plaque with the contact surface extending at least partially into the bounded void and contacting an inner surface of the bounded void.

Referring primarily to FIGS. 2 and 3, in the method for determining calibration parameters, such as the tool frame, the operator mounts the calibration plaque 32 to a rigid support 35 in the operating space of the robot assembly 10. Similar to the method described above for determining contact positions of the robot assembly 10, the subject method moves the robot assembly 10 from an initial position toward a contact position. (the difference as shown between FIGS. 2 and 3). However, in this method, the robot assembly 10 is moved from the initial position where the contact surface is spaced from the inner surface 42 of the bounded void 36 toward the contact position where the contact surface of the robot arm 14 is at least partially extended into the calibration element 34 and contacts a segment, not numbered, on the inner surface 42 of the bounded void 36.

More specifically, once the tool 22 of the robot assembly 10 is extended at least partially into the bounded void 36 of the calibration element 34, the tool contact surface 24 is capable of contacting the inner surface 42 of the bounded void 36 upon movement. Preferably, the tool 22 of the robot assembly 10 is approximately perpendicular to the calibration plaque 32. The tool 22 is then moved such that the tool contact surface 24 contacts the segment on the inner surface 42. The movement of the robot assembly 10 continues until the contact surface contacts the segment. The sensing device 23 detects when the contact surface of the robot arm 14 contacts the segment on the inner surface 42 of the bounded void 36. In the preferred embodiment of this method, the robot assembly 10, having the tool 22, is repositioned into the initial position after the robot assembly 10 contacts the segment on the inner surface 42 of the bounded void 36. The robot assembly 10 is then moved toward a plurality of contact positions where the contact surface of the robot arm 14 contacts a corresponding plurality of segments on the inner surface 42 of the bounded void 36 and the sensing device 23 detects the contact positions (refer to FIG. 4). The detected contact position is representing the contact position of the robot assembly 10 relative to the inner surface 42 of the bounded void 36 when the sensing device 23 detects contact between the contact surface and the segment. The recorded contact positions are processed to obtain corresponding positional values indicative of the inner surface 42 of the bounded void 36, and a value, representing the tool frame (the tool frame value), is calculated based on the obtained positional values as well as the known geometries of both the tool 22 and the bounded voids 36. The recorded contact positions can be stored for subsequent reference.

Figure 4:
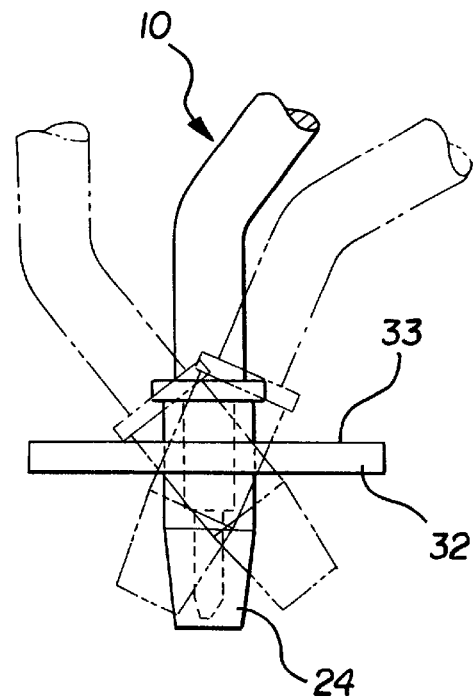
FIG. 4 is a partially cross-sectional side view of the calibration plaque with the contact surface contacting the inner surface of the bounded void at a plurality of contact positions.

Notice that when the bounded void 36 of the calibration element 34 comprises the relatively circular shape, the method for determining the tool frame of the robot 30 is simplified in that the orientation of the calibration element 34 need not be determined. As shown in FIG. 4, by moving the robot assembly 10 to the plurality of contact positions with different orientation of the tool 22 and contact surface 24, the location of a center of the bounded void 36 of the calibration plaque 32 can be determined. As appreciated, this is particularly useful for determining many calibration parameters including TCP location.

Figure 5:
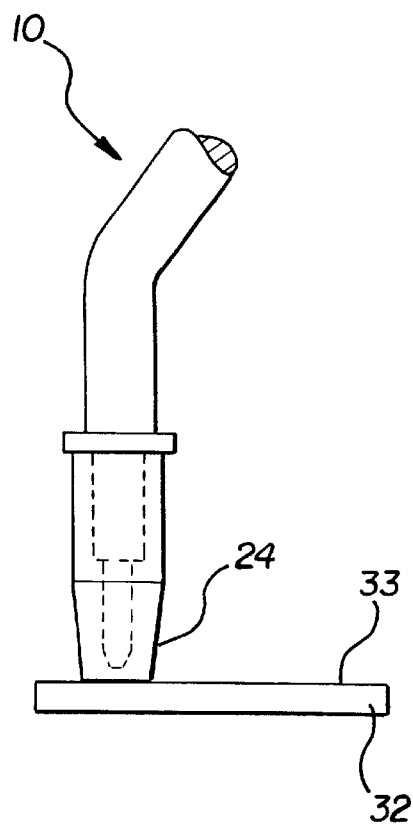
FIG. 5 is a partially cross-sectional side view of the calibration plaque with the contact surface of the robot assembly contacting an outer facing of the calibration plaque such that the location and an orientation of the TCP are partially determined.

Referring now to FIG. 5, in cases where an additional location of the tool frame or the or the TCP must be determined, the subject invention incorporates an additional step that moves the robot assembly 10 toward at least one contact position on the outer facing 33 of the calibration plaque 32 where the contact surface of the robot arm 14 contacts the point on the outer facing 33 of the calibration plaque 32. As such, the orientation of the tool frame or the TCP can be determined. Furthermore, with knowledge of the thickness of the calibration plaque, the location of the outer facing can be determined.

In cases where the tool 22 is rotated within the bounded void 36, the tool 22 is subsequently re-positioned until the tool contact surface 24 of the tool 22 contacts the inner surface 42 of the bounded void 36. As appreciated, the more iterations of positioning the tool 22 within the bounded void 36, the more accurate the calculation for the tool frame value up to a limit related to overall robot accuracy and repeatability. As appreciated, if a location of the calibration element 34 is known, then rotations of the tool 22 may not be required to determine or recover the tool frame.

Also as appreciated, once the tool frame value is calculated, the tool frame value can be stored for subsequent reference. Particularly in cases where the operator is verifying a pre-set tool frame, the operator merely repeats some or all of the steps of the method outlined above, and then the operator compares the new tool frame value with the stored tool frame value. If the difference between the new tool frame value and the stored tool frame value is greater than a specified tolerance, then the tool frame can be adjusted accordingly. As appreciated, the entire tool frame need not be computed or adjusted. Instead, only the portions of interest or the portions of the tool frame that are likely to be incorrect need to be determined.

As appreciated, the determined calibration parameter, such as the tool frame, can be corrected by processing stored contact positions relative to a current plurality of contact positions. Additionally, the contact positions can be further utilized to determine the joint angle of the robot assembly 10 such that the correction is a correction to one of the joint angles.

Although the method of determining calibration parameters has been described above to include the sensing device 23, it is to be understood that the method of determining calibration parameters can be done without the sensing device 23 in the context of the monitoring integral operating parameters within the robot assembly 10. In such a case, if the integral operating parameter to be monitored is motor torque via torque observer sensing technology, then when the tool 22 contacts the inner surface 42 of the bounded void 36, the motor torque exceeds the operating parameter threshold, i.e., the motor torque limit, and the positional value can now be obtained, recorded, and stored.

In the embodiment for determining calibration parameters by monitoring integral operating parameters, calibration of the robot assembly 10 can be corrected by processing the stored contact positions relative to a current plurality of contact positions and determining a calibration correction factor to modify the calibration accordingly. With the tool frame determined by the subject method, a tool frame correction factor can be determined by evaluating differences between a current tool frame and a previously determined tool frame which has been stored.

As with determining calibration parameters, such as the tool frame, of the robot assembly 10, a sensing technology incorporating a sensing device 23 may also be utilized in a method of determining a working, or reference, frame in the operating space of the robot assembly 10. As appreciated, the reference frame may also be known in the art as a 'workcell.' In this embodiment of the method, the sensing device 23 detects contact between the contact surface of the robot arm 14 and an object contact surface 26. In this embodiment, the object contact surface is equivalent to the surface 26 of the workpiece 28 previously described, and will be numbered as such. It is understood that the object contact surface 26 is the surface 26 of the external object 28.

Referring now to FIG. 6, the reference frame of the operating space is closely related to an outline of the operational path that the robot assembly 10 observes relative to the external object 28, such as a workpiece. The reference frame of the operating space can be specific to an actual part or parts, can represent the workcell in which the part or parts are placed, or can be any frame of reference in which the robot motion occurs. As described above, in this method, the external object 28 can be the actual part, fixturing in the workcell, or other objects with rigidly fixed surfaces in the robot workcell. Also in this method, both the tool 22 of the robot assembly 10 and the external object 28 within the operating space must be of known geometries.

In order to determine the reference frame of the robot workspace, a plurality of contact points are determined relative to the reference frame. This plurality is represented in phantom in FIG. 6. It is to be understood in view of the following description that the plurality of contact points can be determined to be on the object contact surface 26 or the contact surface 24 of the robot arm 14. Further, a first vector approximately normal to either the contact surface 24 or the object contact surface 26 at one of the plurality of contact points is determined. A geometrical relationship between the robot assembly 10 and at least one of the contact surface 24 and the object contact surface 26 is also determined. Next, as with the other embodiments of the subject invention, the robot assembly 10 is moved from the initial position toward the contact position or the plurality of contact positions. To accomplish this, the operator manipulates the tool contact surface 24 to the contact positions on the surface 26 of the external object 28. As discussed above, for calculation purposes, it is critical that both the tool 22 and the workpiece 28 include known geometries.

More specifically, at the initial position, a second vector extends between the contact surface 24 and the contact point. The second vector is approximately normal to either the contact surface 24 or the object contact surface 26. The robot assembly 10 is moved along the first vector toward the contact position. At the contact position, the contact surface 24 of the robot arm 14 contacts the object contact surface 26 of the external object 28.

Movement of the robot assembly 10 continues until the sensing device 23 detects the contact between the contact surface 24 and the object contact surface 26. At this point, the contact position of the robot assembly 10 is recorded when the sensing device 23 detects the contact. Positional values can be obtained for each different contact position where the tool 22 contacts the surface 26 of the workpiece 28. Finally, a value representing the working frame (the working frame value) is calculated based on the obtained positional values, and the known geometries of both the tool 22 and the workpiece 28.

Although the method of determining the reference frame has been described above to include the sensing device 23, it is to be understood that the method of determining the reference frame can be done without the sensing device 23 in the context of the monitoring integral operating parameters within the robot assembly 10. In such a case, if the integral operating parameter to be monitored is motor torque via torque observer sensing technology, then upon contacting the object contact surface 26 of the external object 28, the motor torque of a previously identified sensor axis or axes exceeds a previously selected threshold, i.e., the motor torque limit. Similar to above, positional values can be obtained and recorded for the different contact positions determined from monitoring the integral operating parameter.

Continuing, a variation of the method for determining a reference frame of an operating space of the robot assembly 10 may be employed to establish a new reference frame. In order to set a new reference frame, in this alternative method the operator first determines several desired contact points on the workpiece 28 and also determines several normal vectors to the surface 26 of the workpiece 28. For calculation purposes, a vector relationship is recognized between pairs of the several contact points determined by the operator. As appreciated, for setting the new reference frame, at least three of the several normal vectors to the surface 26 of the workpiece 28 must be mutually non-parallel. Similarly, at least three of the vector relationships recognized between pairs of contact points must also be mutually non-parallel. The operator next determines the geometry of the tool 22 relative to the face plate 20 or some other reference point of the robot assembly 10. The robot assembly 10 is then moved to contact the workpiece 28 at or approximate to (i.e., in the vicinity of) each of the determined contact points.

The sensing technology incorporating the sensing device 23 detects contact and positional values can be obtained and recorded for each different position that the tool 22 contacts the surface 26 of the workpiece 28. Finally, a value representing the new reference frame (the new reference frame value) is calculated based on the obtained positional values, the geometry of the previously determined contact points on the workpiece 28, and the known geometries of the tool 22. As appreciated, the determination of the positions and the normal vectors to the surface 26 of the workpiece 28 are particularly suited to offline programming. In this method, an approximation of the reference frame is used to move to positions defined by offline programming and the reference frame can be determined without the operator being required to teach any position.

As appreciated, a further variation of the method for determining the reference frame of the operating space of a robot assembly 10 may be employed to clone a first reference frame from a first operating space to establish a second reference frame in a second operating space. To accomplish this, once the first reference frame is determined in the first operating space, the steps of the method required to determine the first reference frame are generally repeated to establish the second reference frame provided that the same contact points, and the same geometries are utilized in the second operating space of the robot assembly 10.

Sensing technologies, such as torque observer sensing, may also be utilized in methods for general calibration and actual recovery of the calibration of the robot assembly 10. Similar to the method described above relative to reference frame determination and setting, by predetermining at least one reference contact point and at least one normal vector to the surface 26 of the workpiece 28, various robot calibration parameters can be determined provided that known geometries are used for the tool 22 and the contact points. For example, such calibration parameters may include, but are not limited to, the tool frame and the TCP (as outlined above), the accuracy of the relative angles between robot extension members 14, and gravity compensation factors pertinent to the extension members 14 of the robot assembly 10. With respect to actual recovery of the calibration of the robot assembly 10, in practical situations where a robot calibration parameter is 'lost' due to an unexpected system failure, the robot calibration parameter can be recovered where that specific robot calibration parameter and the contact point or contact points utilized in determining the specific robot calibration parameter have been recorded and stored.

Finally, in all instances the methods disclosed above were described in a context where the primary integral operating parameter being monitored by the sensing technology is motor torque. As appreciated, and as discussed above, the scope of the available integral operating parameters is not intended to be limited only to that of torque. Furthermore, the steps disclosed in the above methods are not limited to being performed in the order disclosed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that reference numerals are merely for convenience and are not to be in any way limiting, the invention may be practiced otherwise than as specifically described.

What is claimed is:

1. A method of determining a contact position of a robot assembly relative to an object external to the robot assembly wherein the robot assembly includes at least one arm having a contact surface, and a controller, said method comprising the steps of:

moving the robot assembly from an initial position where the contact surface is spaced from the external object toward the contact position where the contact surface of the robot arm contacts a point on the external object;

determining operating values of the robot assembly as the robot assembly moves between the initial position and the contact position;

establishing at least one operating parameter threshold;

comparing the operating values to the operating parameter threshold;

continuing the movement of the robot assembly provided the operating values are less than or equal to the operating parameter threshold;

recording the contact position of the robot assembly relative to the external object when the operating values of the robot assembly exceed the operating parameter threshold; and said method characterized by the step of determining operating values of the robot assembly being further defined as monitoring an integral operating parameter within the robot assembly during the movement of the robot assembly between the initial position and the contact position to determine when the robot assembly contacts the external object.

2. A method as set forth in claim 1 further including the step of determining a geometrical relationship between the contact surface on the arm and the robot assembly.

3. A method as set forth in claim 1 wherein the step of establishing at least one operating parameter threshold is further defined as establishing the operating parameter threshold to indicate the movement of the robot assembly independent of contact with the external object.

4. A method as set forth in claim 1 wherein the step of recording the contact position of the robot assembly relative to the external object is further defined as recording the contact position when the operating values exceed the operating parameter threshold by a predetermined tolerance.

5. A method as set forth in claim 1 wherein the step of moving the robot assembly is further defined as issuing a robot motion command to move the robot assembly.

6. A method as set forth in claim 1 further including the step of processing the recorded contact position of the robot assembly to obtain a positional value indicating a location of the external object relative to the robot assembly.

7. A method as set forth in claim 1 further including the step of selecting at least one axis on a portion of the robot assembly where the integral operating parameter within the robot assembly is monitored.

8. A method as set forth in claim 7 further including the step of maintaining a position of the selected axis relative to the portion of the robot assembly throughout the moving of the robot assembly.

9. A method as set forth in claim 7 wherein the step of establishing at least one operating parameter threshold is further defined as establishing the operating parameter threshold for the selected axis of the robot assembly where the integral operating parameter is monitored.

10. A method as set forth in claim 7 wherein the step of monitoring the integral operating parameter is further defined as monitoring motor torque of the robot assembly.

11. A method as set forth in claim 7 wherein the step of monitoring the integral operating parameter is further defined as monitoring the integral operating parameter selected from the group consisting of velocity of the robot assembly, acceleration of the robot assembly, position of the robot assembly, jerk of the robot assembly, motor torque of the robot assembly, and motor current of the robot assembly, and combinations thereof.

12. A method as set forth in claim 11 wherein the step of establishing at least one operating parameter threshold is further defined as establishing the operating parameter threshold for the selected axis such that the operating parameter threshold is correlative to the selected integral operating parameter being monitored.

13. A method as set forth in claim 12 further including the step of repositioning the robot assembly into the initial position after the robot assembly contacts the external object.

14. A method as set forth in claim 13 further including the step of moving the robot assembly from the initial position toward a second contact position where the contact surface of the robot arm contacts a second point on the external object after the robot assembly has been repositioned into the initial position.

15. A method as set forth in claim 13 further including the steps of moving the robot assembly from the initial position toward a plurality of contact positions where the contact surface of the robot arm contacts a plurality of corresponding points on the external object, and recording the plurality of contact positions when the operating values of the robot assembly exceed the operating parameter threshold.

16. A method as set forth in claim 15 further including the step of storing the recorded contact positions of the robot assembly relative to the external object.

17. A method as set forth in claim 16 further including the step of processing the stored contact positions of the robot assembly to obtain a location of the external object relative to the robot assembly in multiple degrees of freedom.

18. A method as set forth in claim 16 further including the step of determining a correction factor defined as a difference between the obtained location of the external object and a previously obtained location of the external object.

19. A method as set forth in claim 16 further including the step of utilizing the plurality of contact positions to determine a working frame of the robot.

20. A method as set forth in claim 16 further including the step of determining a difference between the stored contact positions and a second plurality of stored contact positions representing current contact positions to correct any error in calibration of the robot assembly.

21. A method as set forth in claim 13 further including the step moving a workpiece held within the robot arm by manipulation of the robot assembly such that the contact surface of the robot arm is defined by the workpiece.

22. A method as set forth in claim 21 further including the step of moving the robot assembly from the initial position toward a second contact position where the external object contacts a second point on the contact surface of the robot arm after the robot assembly has been repositioned into the initial position.

23. A method as set forth in claim 21 further including the steps of moving the robot assembly from the initial position toward a plurality of contact positions where the external object contacts a plurality of corresponding points on the contact surface of the robot arm, and recording the plurality of contact positions when the operating values of the robot assembly exceed the operating parameter threshold.

24. A method as set forth in claim 1 further including the step of mounting a calibration plaque within an operating space of the robot assembly wherein the calibration plaque includes an outer facing, and at least one calibration element wherein the calibration element defines a bounded void having an inner surface.

25. A method as set forth in claim 24 further including the step of extending the contacting surface of the robot arm at least partially into the bounded void of the calibration element prior to moving the robot assembly from the initial position.

26. A method as set forth in claim 25 wherein the step of moving the robot assembly is further defined as moving the robot assembly toward the contact position where the contact surface of the robot arm contacts a segment on the inner surface of the bounded void.

27. A method as set forth in claim 26 further including the step of repositioning the robot assembly into the initial position after the robot assembly contacts the segment on the inner surface of the bounded void.

28. A method as set forth in claim 27 wherein the step of moving the robot assembly is further defined as moving the robot assembly toward a plurality of contact positions where the contact surface of the robot arm contacts a corresponding plurality of segments on the inner surface of the bounded void.

29. A method as set forth in claim 28 wherein the step of moving the robot assembly toward the plurality of contact positions is further defined as moving the robot assembly toward at least one contact position on the outer facing of the calibration plaque where the contact surface of the robot arm contacts the point on the outer facing of the calibration plaque.

30. A method as set forth in claim 28 further including the step of recording the plurality of contact positions when the operating values of the robot assembly exceed the operating parameter threshold.

31. A method as set forth in claim 30 further including the step of storing the recorded contact positions.

32. A method as set forth in claim 31 further including the step of correcting error in calibration of the robot assembly by processing the stored contact positions relative to a current plurality of contact positions and determining a calibration correction factor.

33. A method as set forth in claim 28 further including the step of utilizing the contact positions to determine a tool frame of the robot assembly.

34. A method as set forth in claim 33 further including the step of determining a tool frame correction factor defined as a difference between the tool frame and a previously determined tool frame.

35. A method as set forth in claim 28 further including the step of utilizing the contact positions to determine a tool center point of the robot assembly.

36. A method of determining a calibration parameter of a robot assembly having a calibration plaque mounted within an operation space of the robot assembly wherein the calibration plaque includes an outer facing, and at least one calibration element defining a bounded void having an inner surface, and wherein the robot assembly includes at least one arm having a contact surface, a controller, and a sensing device that detects contact between the contact surface of the robot arm and the calibration plaque, said method comprising the steps of:

moving the robot assembly from an initial position toward a contact position;

detecting when the contact surface of the robot arm contacts a segment on the inner surface of the bounded void with the sensing device;

continuing the movement of the robot assembly until the contact surface contacts the segment;

recording the contact position of the robot assembly relative to the inner surface of the bounded void when the sensing device detects contact between the contact surface and the segment;

utilizing the recorded contact position to determine the calibration parameter; and said method characterized by the step of moving the robot assembly being further defined as moving the robot assembly from the initial position where the contact surface is spaced from the inner surface of the bounded void toward the contact position where the contact surface of the robot arm is at least partially extended into the calibration element and contacts the segment on the inner surface of the bounded void.

37. A method as set forth in claim 36 wherein the step of moving the robot assembly is further defined as moving the robot assembly toward a plurality of contact positions where the contact surface of the robot arm is at least partially extended into the calibration element and contacts a corresponding plurality of segments on the inner surface of the bounded void such that each contact position is different.

38. A method as set forth in claim 37 wherein the step of moving the robot assembly toward the plurality of contact positions is further defined as moving the robot assembly toward at least one contact position on the outer facing of the calibration plaque where the contact surface of the robot arm contacts a point on the outer facing of the calibration plaque.

39. A method as set forth in claim 37 wherein the step of utilizing the recorded contact position is further defined as utilizing the recorded plurality of contact positions to determine the calibration parameter.

40. A method as set forth in claim 39 wherein the step of utilizing the recorded plurality of contact positions is further defined as utilizing the recorded contact positions to determine a tool center point of the robot assembly.

41. A method as set forth in claim 39 wherein the step of utilizing the plurality of contact positions is further defined as utilizing the recorded contact positions to determine a tool frame of the robot assembly.

42. A method as set forth in claim 39 further including the step of storing the recorded contact positions.

43. A method as set forth in claim 42 further including the step of correcting the calibration parameter by processing stored contact positions relative to a current plurality of contact positions.

44. A method as set forth in claim 39 wherein the step of utilizing the contact positions is further defined as utilizing the contact positions to determine the calibration parameter selected from the group consisting of a joint angle of the robot assembly and a tool frame of the robot assembly such that the correction to the calibration parameter is a correction to one of the joint angles and the tool frame.

45. A method of determining a reference frame in an operating space of a robot assembly wherein an object external to the robot assembly is disposed in the operating space of the robot assembly and includes an object contact surface, and wherein the robot assembly includes at least one arm having a contact surface, a controller, and a sensing device that detects contact between the contact surface of the robot arm and the object contact surface, said method comprising the steps of:

determining a plurality of contact points relative to the reference frame, and determining a first vector approximately normal to one of the contact surface and the object contact surface at one of the contact points;

determining a geometrical relationship between the robot assembly and at least one of the contact surface and the object contact surface;

moving the robot assembly from an initial position toward a contact position;

continuing moving the robot assembly until the sensing device detects contact between the contact surface and the object contact surface;

recording the contact position of the robot assembly when the contact is detected by the sensing device;

utilizing the recorded contact position and the determined geometrical relationship to determine the reference frame; and said method characterized by the step of moving the robot assembly being further defined as moving the robot assembly from the initial position where a second vector, between the contact surface and the contact point, is approximately normal to at least one of the contact surface and the object contact surface along the first vector toward the contact position where the contact surface of the robot arm contacts the object contact surface.

46. A method as set forth in claim 45 wherein the step of determining a plurality of contact points relative to the reference frame is further defined as determining the plurality of contact points to be on the object contact surface of the external object.

47. A method as set forth in claim 45 wherein the step of determining a plurality of contact points relative to the reference frame is further defined as determining the plurality of contact points to be on the contact surface of the robot arm.

\* \* \* \* \*